United States Patent

[11] 3,625,625

[72] Inventors Jan Van Roojen;
　　　　　　　Kenneth M. Hull, both of Rockford, Ill.
[21] Appl. No. 26,293
[22] Filed Apr. 7, 1970
[45] Patented Dec. 7, 1971
[73] Assignee The Ingersoll Milling Machine Company
　　　　　　　Rockford, Ill.
　　　　　　　Continuation-in-part of application Ser. No.
　　　　　　　706,254, Feb. 19, 1968, now abandoned.
　　　　　　　This application Apr. 7, 1970, Ser. No.
　　　　　　　26,293

[54] BORING MACHINE WITH CUTTER TOOTH
　　　ADJUSTMENT
　　　27 Claims, 16 Drawing Figs.
[52] U.S. Cl. ....................................................... 408/158
[51] Int. Cl. ....................................................... B23b 39/00
[50] Field of Search ........................................... 408/153,
　　　　　　　　　　　　　　　　　　　　　　　　154, 156, 158, 179

[56] References Cited
　　　　　　UNITED STATES PATENTS
3,530,745　3/1967　Milewski ......................　408/158

Primary Examiner—Gerald A. Dost
Attorney—Wolfe, Hubbard, Leydig, Voit & Osann, Ltd.

ABSTRACT: A rotary and tubular spindle projects from a reciprocatory tool head and carries a radially expandable and retractible tooth for finish boring the hole in a workpiece. This tooth is fixed to the free end of a cantilever bent radially by the camming action of a thin wedge acting through a pair of roller bearings to adjust the tooth radially to a position determined by a stop on the head disposed beyond the other end of the spindle and engageable with a power actuated push rod extending through the spindle and past the stop. The stop may be adjusted axially in fine increments by a screw and nut actuated by a reversible electric stepping motor which may be activated when adjustment of the finishing tooth is needed to compensate for wear and when the tooth is out of engagement with the workpiece to be bored.
The cutting tooth, cantilever and wedge surface assembly may be duplicated and disposed in transaxial planes angularly spaced around the spindle axis.
The cantilever may be modified to provide for the boring of holes smaller in diameter than the supporting spindle.

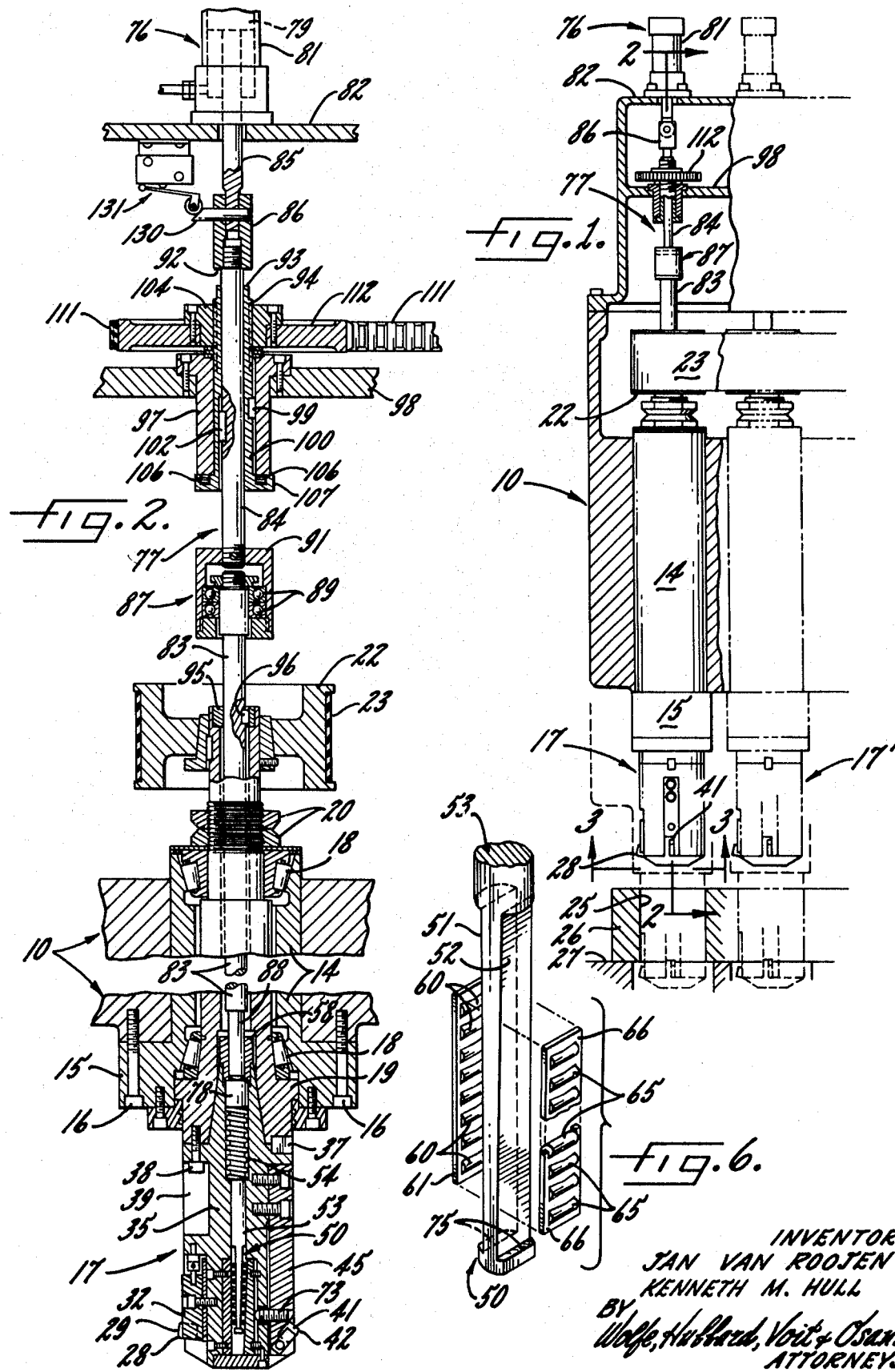

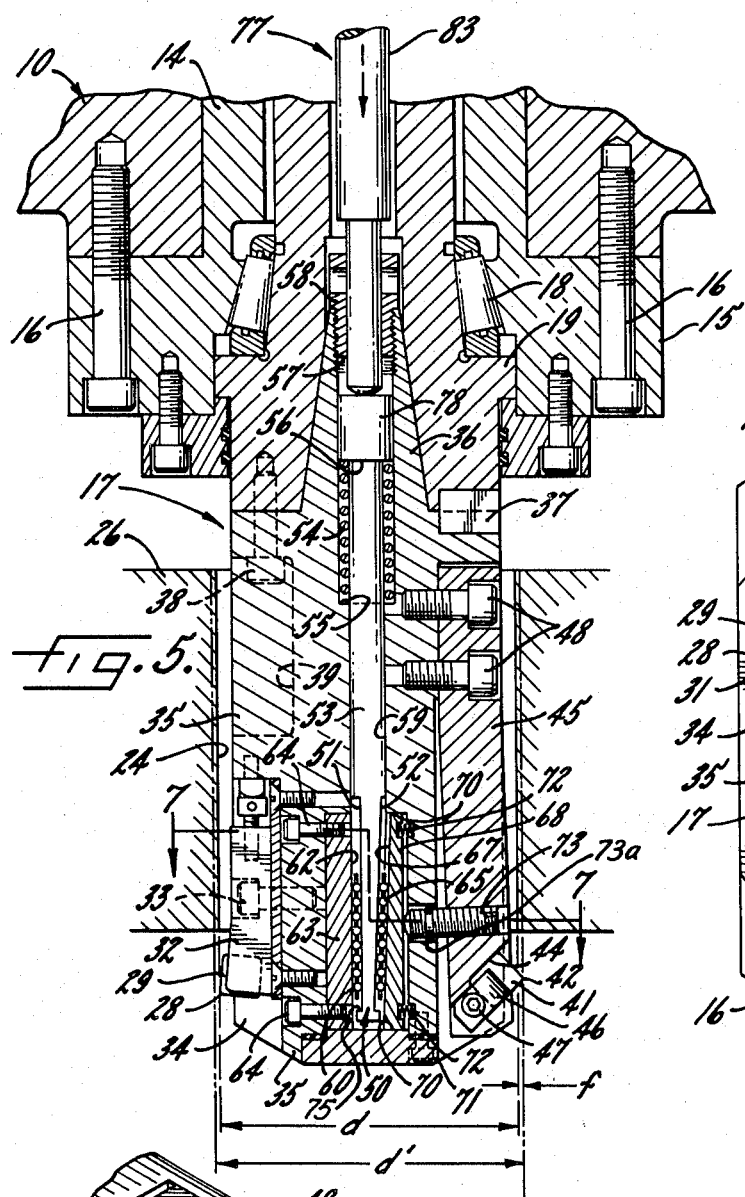

INVENTORS.
JAN VAN ROOJEN
KENNETH M. HULL
BY Wolfe, Hubbard, Voit & Osann
ATTORNEYS.

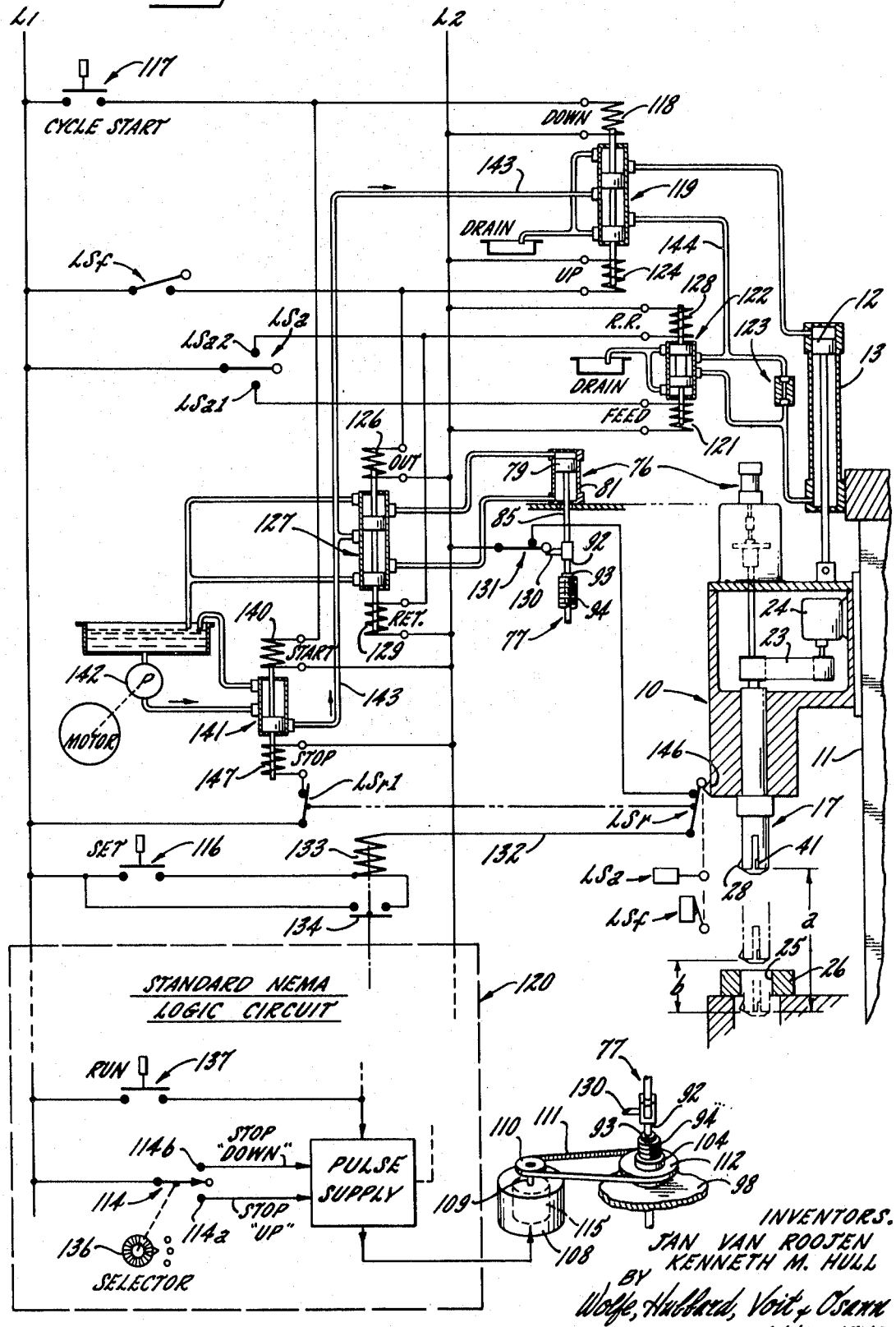

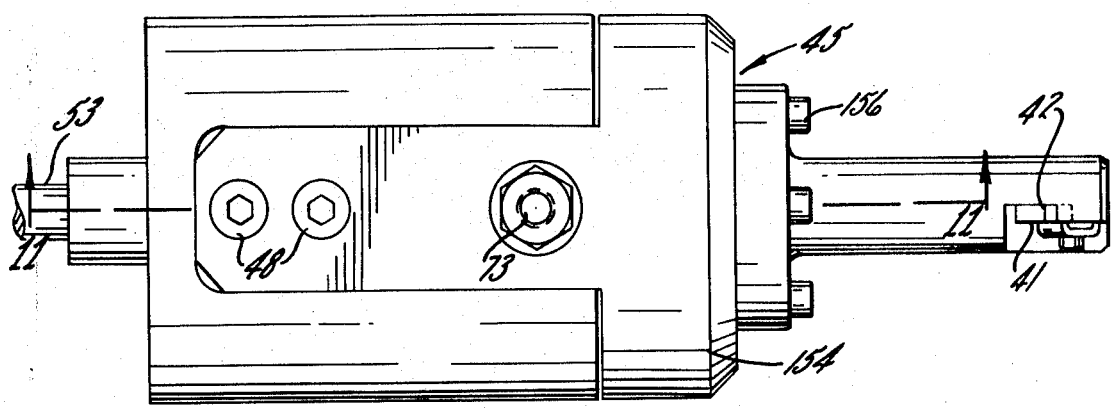
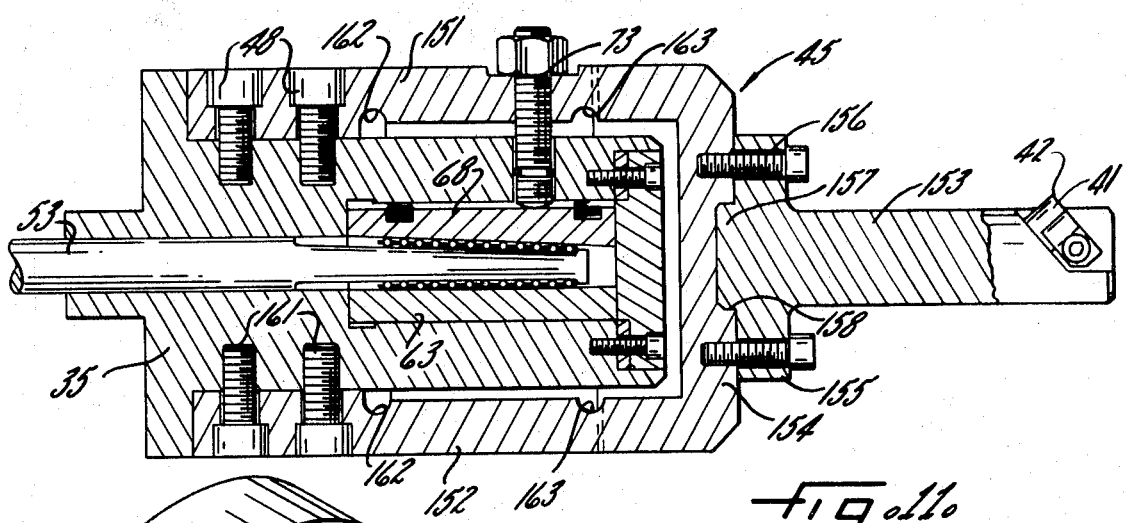
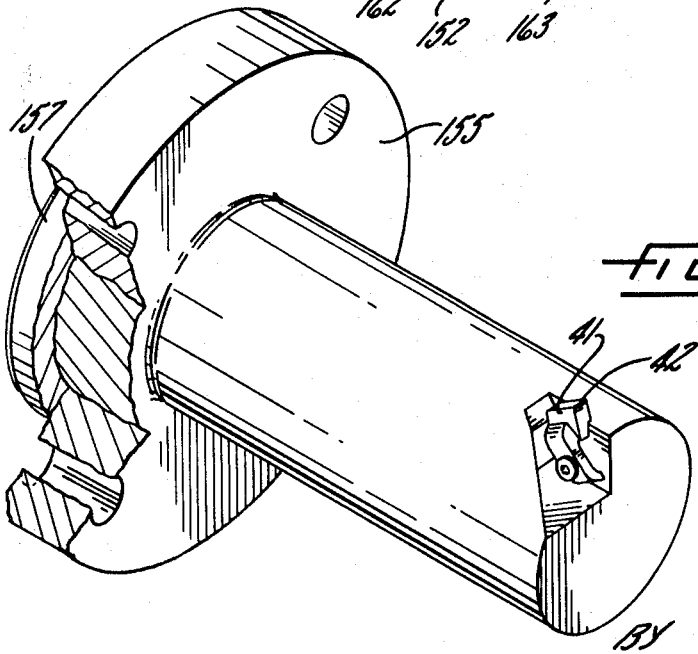

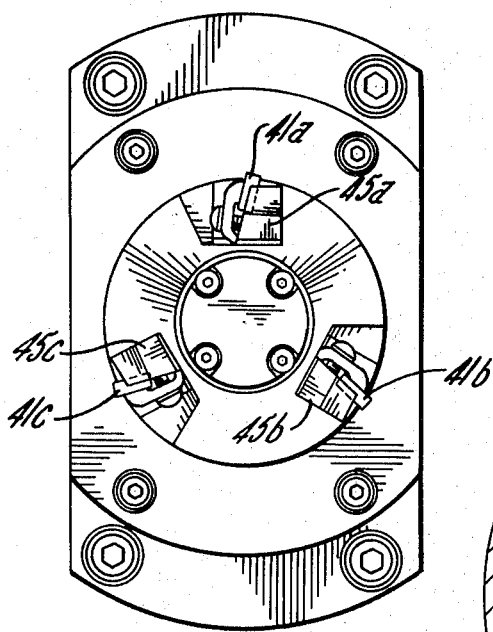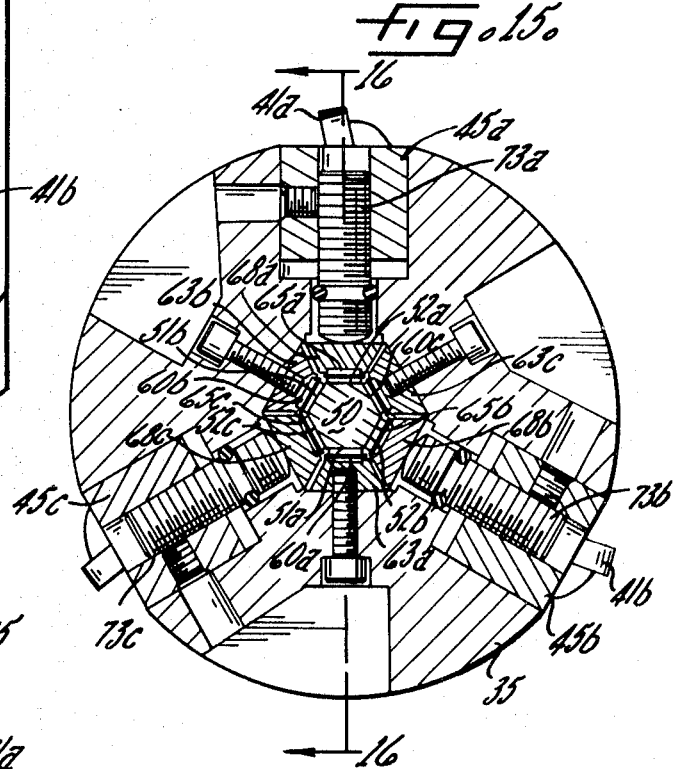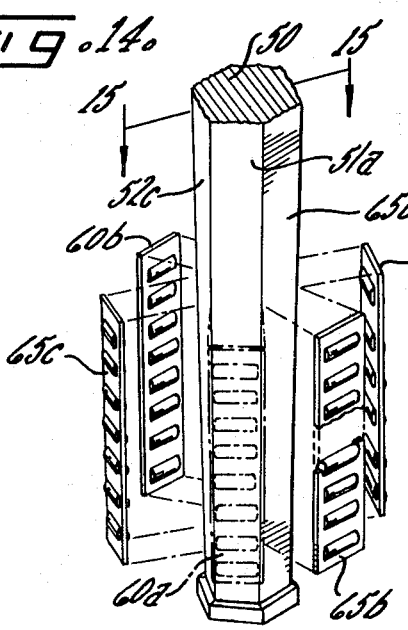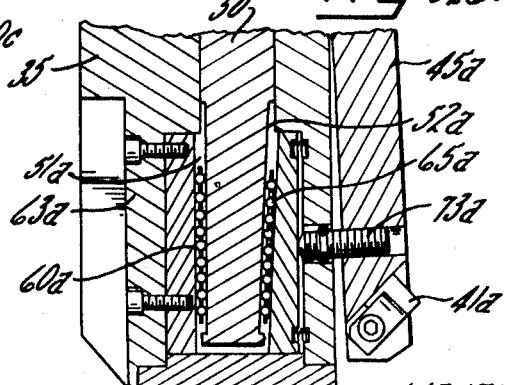

3,625,625

BORING MACHINE WITH CUTTER TOOTH ADJUSTMENT

CROSS-REFERENCE TO RELATED APPLICATION

This application is a continuation-in-part of our pending application Ser. No. 706,254, filed Feb. 19, 1968 and now abandoned.

BACKGROUND OF THE INVENTION

The invention relates to the mounting of a cutting tooth on a rotary boring spindle for radial adjustment to cutting position or for wear adjustment and has more particular reference to a cantilever type tooth mounting actuated by a wedge shiftable along the spindle axis by a selectively operable power actuator.

Adjustable tooth mountings of this general character are disclosed in Pat. Nos. 2,734,402 (77–4), 3,121,350(77–57), 3,226,101(29cyv., 3,361,013(77–2) and 3,391,585(77–4).

SUMMARY OF THE INVENTION

One objective of the present invention is to provide an adjustable cantilever mounting of the above character which supports the cutter bit with much greater rigidity than has been possible heretofore and thus achieves greater accuracy in the formation of the holes bored in the different positions of adjustment of the bit. This objective is achieved in part by mounting an extremely stiff cantilever on and extending the same along the exterior of a tubular boring spindle and bending the cantilever by a wedge of small slope disposed within the spindle and movable along the axis thereof, the wedge having follower and backup surfaces of sufficiently large area and friction characteristics to transmit the high pressure needed for bending the stiff cantilever.

Attainment of the foregoing objective is facilitated by transmitting the wedging force through a novel arrangement of antifriction bearing elements and by applying such force through a rod moved along the spindle axis by a power actuator between stops, one of which is adjusted selectively in accurately measured increments by controlling the energization of a reversible electric step motor.

Another object is to adapt the cantilever mounting for the boring of substantially smaller holes than has been possible heretofore.

Still another object is to correlate the back and forth movements of the wedge actuating rod so as to permit the finish boring tooth to act during retraction of the boring head and remain inactive as the head is fed forwardly to effect rough boring of a work hole.

BRIEF DESCRIPTION OF THE DRAWINGS

FIG. 1 is a vertical cross-sectional view through a boring head equipped with cutter tooth adjusting mechanism embodying the novel features of the present invention.

FIGS. 2 and 3 are sections taken respectively along the lines 2—2 and 3—3 of FIG 1.

FIG. 4 is a fragmentary perspective view of the boring cutter.

FIG. 5 is an enlargement of the lower part of FIG. 2 with the finishing tooth in expanded position.

FIG. 6 is a fragmentary perspective view of the tooth expanding wedge.

FIG. 9 is a schematic view and diagram of the electric and hydraulic circuits.

FIG. 10 is a fragmentary side view of a modified form of the cantilever tooth mounting adapted for boring small holes.

FIG. 11 is a section taken on the line 11—11 of FIG. 10.

FIG. 12 is a fragmentary and broken away perspective view of the boring tooth and its mounting.

FIG. 13 is an end view like FIG. 3 but showing the cutter equipped with three finishing teeth.

FIG. 14 is a schematic perspective view of the wedge and roller bearings of the cutter shown in FIG. 13.

FIG. 15 is an enlarged cross section similar to FIG. 7 but showing the multiple blade finishing cutter, the section being taken approximately along the line 15—15 of FIG. 14.

FIG. 16 is a fragmentary section taken along the line 16—16 of FIG. 15.

DESCRIPTION OF THE PREFERRED EMBODIMENTS

Figures 7, 8:
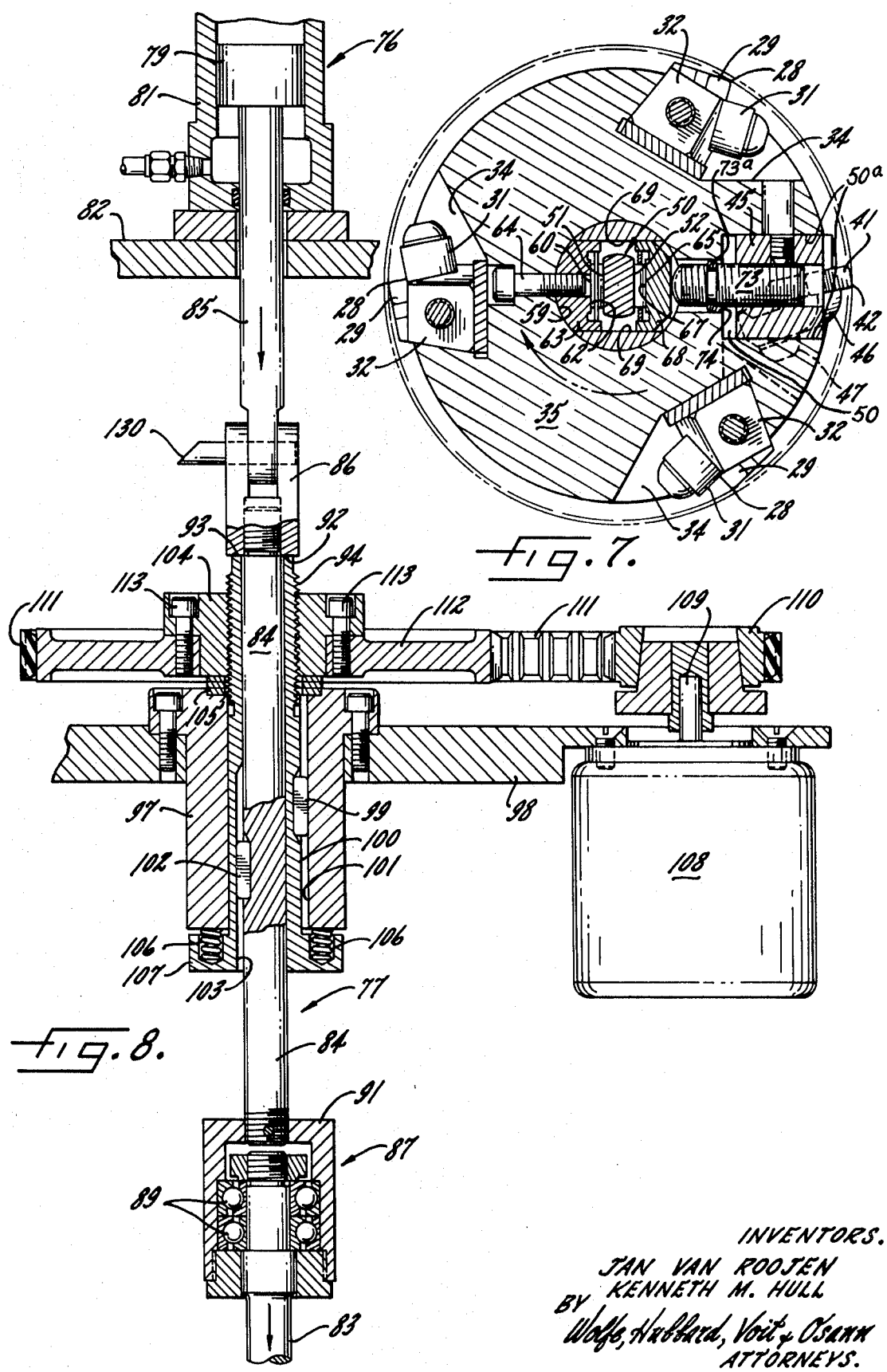
FIG. 7 is a section taken along the line 7—7 of FIG. 5.
FIG. 8 is an enlargement of the upper part of FIG. 2.

The invention is shown in the drawings incorporated in a boring machine having a tool head 10 reciprocable along ways 11 (FIG. 9) by a suitable actuator which may comprises a piston 12 disposed within a stationary cylinder 13 and reciprocable through a range $a$ (FIG. 9) that may be determined in the usual way by limit switches LSa, LSf, LSr actuated by a cam 146 on the tool head and operating conventional value mechanism shown in FIG. 9 to produce a desired cycle of rapid approach, forward feed $l$, return feed $b$ and rapid return motions of the head to the position shown in FIGS. 1 and 9. A tool spindle 17 composed of separable parts is journaled in the head and projects cantilever fashion and parallel to the ways from the lower end of the head. Herein, the spindle is journaled in a sleeve 14 through the medium of radial and axial thrust bearings 18, the sleeve having an end flange 15 clamped to the lower end of the head by screws 16 and the bearings 18 axially spaced along the sleeve and held between a flange 19 and adjusting nuts 20. Above the nuts 20, the spindle carries a pulley 22 herein driven through a toothed belt 23 from an electric motor 24 (FIG. 9) carried by the head 10. The motor may also drive the parallel spindle 17' of a similar boring unit carried by the head 10.

Rough or semifinish of a work hole 25 in a workpiece 26 secured in a suitable fixture 27 is effected in the present instance during the advance of the head along the ways 11 and by the tips of a plurality of teeth 28 comprising the corners of indexable wafers 29 secured by screw actuated clamps 31 in seats formed in and angularly spaced around the ends of bars 32 (FIGS. 3 and 5). Each of these bars is secured by screws 33 in slot 34 (FIGS. 4 and 5) extending along the outer end portion of the spindle which is formed by a sleeve 35 constituting the cutter body or outer end portion of the spindle 17. Herein, the tapered inner end portion 36 of this body is seated in a complemental taper in the spindle end, coupled to the latter by a key 37 and held by screws 38 having heads disposed in recesses 39 angularly spaced around the body. This permits convenient removal of the cutter part of the spindle.

With the boring cutter constructed and mounted as above described, a hole 24 will be bored in the fixtured workpiece by the teeth 28 during a rapid advance followed by feeding of the head 10 and spindle from the position shown in full in FIG. 1 to that shown in phantom, the boring teeth then being disposed beyond the outward end of the hole as shown in FIG. 5. Instead of rapidly retracing the tool out of the work as is customary, the head may be retracted after the boring at a rate slow enough to enable another tooth 41 on the spindle to enlarge the hole a small amount and leave the latter with a fine finish of extremely precise size. Such finish boring is effected by the tip 42 of the tooth 41 which projects radially and outwardly from the cutter body 35 and angularly spaced from the teeth 28. The finishing tooth is mounted for radial adjustment relative to the body between an inactive inner position (FIG. 2) of shorter radius than the teeth 28 and an outer position (FIG. 5) of a radius slightly greater by an amount equal to the desired depth of the finishing cut to be taken during the retraction of the cutter out of the work from the position shown in phantom in FIG. 1 and in full in FIG. 5. The depth of such finishing cut is indicated at $f$ on an enlarged scale in FIG. 5.

FINISH TOOTH MOUNTING AND ADJUSTMENT

Herein the finishing tooth 42 is the outwardly exposed corner of a wafer of suitable cutting material disposed in a seat 44 (FIGS. 4 and 5) in the free end portion of an elongated cantilever 45 and secured therein by a clamp 46 actuated by a screw 47. In the form shown in FIGS. 1 to 5, the cantilever is a straight and relatively thick bar of resilient steel disposed and fitting closely in an outwardly opening slot 40 formed in the periphery of the cutter body 35 and extending to the free end thereof generally parallel to the spindle axis. At its inner end, the bar is anchored to the body at the bottom of the slot by screws 48 spaced along the bar. The unsupported end portion is thus free to bend outwardly in a radial plane and thus move the tooth 41 outwardly from the inner or inactive position shown in FIG. 2 to the outer or active position (FIG. 5) in which the tooth tip 42 is disposed at a radius slightly greater than the radii of the semifinishing teeth 28. Owing to its substantial thickness and composition, the bar is extremely stiff and requires the application of substantial outward pressure at its free end to bend the bar and set the tooth 42 outwardly. Because of this, the bar provides correspondingly increased rigidity in the support of the cutting tooth. The cantilever is stressed to swing inwardly to the FIG. 2 position when the outward bending pressure is relieved. By virtue of the close fitting of the cantilever bar between the side walls 40a (See FIG. 7) of the slot 40, it is held securely against lateral vibration during cutting action by the tooth 41 in all of its radial positions.

Outward bending of the cantilever and corresponding outward radial shifting of the tooth 41 is effected by an elongated wedge 50 which is disposed within the tubular spindle and cutter body 35 and guided thereby endwise forth and back along the spindle axis. Flat surfaces 51 and 52 (FIGS. 5 and 6) of substantial length and width on opposite sides of the wedge are disposed approximately perpendicular to the plane of swinging of the cantilever 45 and converge outwardly and toward the end of the cutter at a very small angle, for example, three degrees in the present instance. The wedge comprises the outer end portion of a rod 53 whose inner end portion is guided along the axial bore 59 of the spindle and urged inwardly by a spring 54 coiled around the inner end portion of the rod and acting in compression between axially spaced shoulders 55 and 56 on the body and the rod to urge the latter continuously toward the retracted position shown in FIG. 2. This position is limited by a stop 57 on the inner end of the plug 58 threaded into the tapered shank 36 of the cutter body. This arrangement enables the outer portion 35 of the spindle 17, including the shank, the cutter teeth 28, 41, and the wedge 50 to constitute a self-contained cutter unit which may be removed and replaced through the medium of the screws 38.

The surface 51 of the wedge on the side opposite the cantilever 45 parallels the spindle axis as shown in FIG. 5 and is slidable along the backed rigidly by the inner flat surface of a bar 63 disposed in a groove 62. (FIG. 7) extending along the inner face of the bar which is disposed in the transaxial plane of the cantilever and held seated in the bore 59 by screws 64 as shown in FIGS. 5 and 7. To provide a similarly large bearing area on the opposite side of the wedge, a follower bar 68 is disposed in and guided for bodily radial movement by the parallel sides 69 (FIG. 7) and ends 70 of a groove 67 on the side of the bore 59 opposite the backing bar 63 and extending along the outer free end portion of the cantilever. Herein, the outer end 70 is on a cap 71 secured by screws to the end of the cutter body 35. The bar 68, which is urged inwardly toward the wedge by compression springs 72 (FIG. 5), bears continuously and midway between its ends against the end of a screw 73 threaded radially into the free end portion of the cantilever 45 and projecting through a radial hole 74 in the body 35 (FIG. 7). The bar 68 and the screw 73 constitute a follower for the wedge surface 52 and coact with the latter in converting and transmitting the axial force applied to the rod and exerting the greatly magnified resultant force on the free end of the cantilever to bend the latter outwardly.

To effect outward bending of the extremely stiff cantilever above described, the radial force derived through the wedge action must be of substantial magnitude. It is desirable therefore not only to employ a wedge having a small taper and large bearing areas as determined by the length and width of the surfaces 51, 52 but also to minimize the sliding friction between the wedge and its backing 63 and its follower 68. All of this is accomplished in the present instance by interposing antifriction elements of proper area and construction between the opposed wedge and backing and follower surfaces. Herein, these elements comprise rows substantially equal in length and width to the wedge surfaces of small diameter rollers 60 and 65 or needle bearings disposed in spaced parallel slots 60a in plastic retainer bars 61 and 66 and journaled at opposite ends in the ends of the slots. As shown in FIG. 6, the rollers are larger in diameter than the thickness of the retainer plates. The roller units need not be confined endwise and may shift back and forth between the positions shown in FIGS. 2 and 5 relative to walls 75 at the free end of the wedge. The springs 72 above described serve to hold the follower bar 68 against the row of bearings 65 and maintain the assembled relation of the follower, the bearings, and the wedge whenever it becomes desirable to remove or replace the cantilever.

The use of the follower bar 68 and the transmission of its bodily motion outwardly to the cantilever 45 by the screw 73 extending through a hole 74 in the cutter body 35 is advantageous in facilitating manual adjustment of the cutter tooth 41 independently of the automatic mechanism about to be described. Thus, with the screw threaded into a radially disposed hole 74a in the cantilever with the socket head at its exposed outer end, the screw is accessible from exterior of the spindle 35 for convenient rough or setup adjustments of the radial position of the tooth 41.

Also, by fitting an O-type seal ring 73a between an external groove in the screw 73 and the internal wall of the hole 74 in the spindle sleeve 35, the latter is sealed against the ingress of coolant thus preventing foreign matter from coming onto the needle bearings and wedge surfaces.

ACTUATION OF ADJUSTING ROD

Power for advancing the wedge 50 from the normally retracted position shown in FIG. 2 is derived from a suitable actuator 76 mounted on the head 10 beyond the upper end of the sleeve 14 and connected to the wedge through a rod 77 extending along the spindle axis and abutting the inner end 78 of the wedge rod 53. While wedge surfaces may taper inwardly from the end of the spindle and the wedge pulled inwardly to effect the tooth set-out, the outward taper above described requires that the wedge be pushed outwardly to bend the cantilever and be pulled inwardly, herein by the spring 54, to allow the cantilever to retract the tooth 41.

In the form shown, the actuator 76 comprises a piston 79 rigidly connected to the upper end of the push rod 77 and slidable in a cylinder 81 bolted to the top 82 of the head 10, the advanced and retracted positions of the piston being shown in FIGS. 2 and 8. The push rod is divided into lower, intermediate and upper parts 83, 84, 85, the latter being the rod of the piston 79 which is connected to a sleeve 86 threaded onto the upper end of the rod 84. To permit the wedge to turn with the spindle without turning of the intermediate part 84, the latter is coupled through a bearing assembly 87 to the rod 83 whose reduced lowered end 88 is telescoped into the plug 58 into abutment with the end 78 of the cutter adjusting rod 53. The coupling disposed above the drive pulley 22 comprises antifriction bearings 89 retained in inner and outer race ways secured respectively to the upper end of the rod 83 and an inverted cup 91 fixed to the lower end of the push rod 84. Below the bearing assembly, the rod 83 is guided in a bushing 95 within the pulley 22 and slides along a key 96 carried by this bushing.

WEDGE POSITIONING STOPS AND STEP ADJUSTMENT THEREOF

The advance of the piston rod 85 and therefore the set-out of the tooth 41 through the wedge and cantilever as above described is gaged with extreme precision by abutment of the lower end 92 of the sleeve 86 on the piston rod with a stop 93 fixed on the boring head but adjustable along the spindle axis to permit the expanded position of the tooth tip 42 to be varied. Preferably, the stop 93 comprises the upper end of a tubular screw 94 telescoped around the rod 84 and extending through and guided for endwise movement in a flanged bushing 97 secured to a partition 98 within the boring head 10. A key 99 on the screw body 100 projects into an elongated slot 101 extending along the bushing, the screw is thus held against turning but is adjustable endwise along the bushing. A key 102 and slot 103 spline couples the screw to the rod 84.

Axial adjustment of the screw 94 and therefore the stop 93 is effected by turning a nut 104 threaded onto the upper end of the screw and held against a bearing ring 105 on the upper end of the bushing 97. Backlash in the screw coupling is thus taken up by springs 106 acting in compression between the lower end of the bushing and a flange 107 of the screw body.

It will be apparent that when the piston 79 of the actuator 76 is raised to an upper limit position shown in phantom in FIG. 2, the abutment is separated from the stop 93 which is then free to be raised or lowered as desired. In the raising of the piston 79, the push rod 77 and the wedge thereon are retracted upwardly by the spring 54 thus allowing the cantilever to bend inwardly and retract the tooth 41 away from boring position and to a position determined by the stop 57 on the boring spindle. Such changing of the position of the adjustable stop 93 is preferably effected by an actuator which is reversible, operable step-by-step, and easily controllable, preferably by simple electric circuitry, so that the extent of the tooth setout in successive boring cycles may be gaged accurately and in advance of the time when the boring by the tooth 41 is to occur. To accomplish this with minimum cost of equipment, the invention utilizes an electric stepping motor 108 (FIGS. 8 and 9) of conventional construction but one which is reversible and controllable through simple circuitry correlated with the cycles of the boring machine above described. The casing of the motor 108 is bolted to the partition 98 and the upright motor shaft 109 carries a toothed pulley 110 meshing with the teeth of an endless timing belt 111 extending around and meshing with complemental teeth on a pulley 112 telescoped around and secured by screws 113 to the nut 104.

Motors of the stepping type have a permanent magnet rotor 115 (FIG. 9) which is indexed in fixed steps and to a multiplicity, for example 200 per revolution, of stable positions by successive direct current pulses. Thus, by closure of a control switch 116 acting through conventional circuitry, the windings of the motor are excited sequentially to turn the rotor through any desired number of its steps as determined by a controller mounted in a panel 120 and including components such as a resettable pulse counter, pulse gate, oscillator and translator interconnected in a standard NEMA logic circuit. Suitable for the present purpose are the components and a stepping motor, identified as SS250, sold by the Superior Electric Company. This motor is reversible, the direction of its stepping being determined by the selective actuation of a switch 114 (FIG. 9) by turning of a knob 136. For the boring operation above described, the counter of the motor controller is set to cause turning of the motor shaft through a plurality, for example, five steps or one-fiftieth of a revolution. Such turning as transmitted through the timing belt 111, the nut and screw, the wedge 50 and the cantilever 45 produces a radial adjustment of the tooth 41 of about 0.0001 of an inch.

CONTROL CIRCUITRY AND OPERATION

In the course of repeated cycles performed on successive workpieces by the rough and finish boring teeth 29 and 41 mounted and actuated as above described, the tooth tip 42 wears down resulting in finished bores of smaller sizes which may be detected with great precision through the use of conventional inspection gages. The undersize condition of a work bore may be indicated on a suitable gage after which the switch 116 may be closed manually by the inspecting operator. Such closure will, when the tool head 10 is fully retracted, as evidenced by closure of the limit switch LSr by the cam 146, be effective to pulse the motor 108 and advance the stop 93 one step and in a direction determined by which of the selector switch contacts 114a or 114b is closed. If the switch is set for outward adjustment of the tooth 41, the latter will be set out of the predetermined increment f (FIG. 5) or 0.0001 of an inch in this instance. In the case of an inspection assembly built into an automatic transfer line-up, the switch 116 may be closed automatically in response to the detection of the undersize condition, this signal being retained and used in the next cycle of the boring machine to adjust the stop 93 downwardly and cause the finishing tooth 41 to be set outwardly as above described.

The boring machine constructed as above described is intended during each automatic cycle comprising advance of the head 10 and return to the retracted position shown in FIG. 1 to enlarge a hole 25 in the fixtured workpiece 26 first to a diameter $d$ (FIG. 5) by the action of the teeth 28 while the tooth 41 is held retracted (FIG. 2) and then, after automatic setting of the tooth 41 outwardly to its active position (FIG. 5), to further enlarge the hole to the diameter $d'$ as the head is retracted from its most advanced position. Typical and conventional electric and hydraulic circuitry for activating the head and push rod actuators 13 and 76 for executing such a cycle is shown in FIG. 9.

After the completion of one cycle of the boring machine above described, the tool head will be retracted and the piston of the actuator 76 will be raised thus raising the push rod to separate the abutment 92 from the adjustable stop 93 (FIG. 2) and allow the wedge 50 to be raised by the spring 54 and the cantilever to bend inwardly thus retracting the tooth 41 to active position. At this time, the various parts will be positioned as shown in full in FIG. 9.

An automatic cycle is initiated in response to closure of a starting switch 117 which results in energization of a solenoid 140 which shifts a valve upwardly and to admit high pressure fluid from a motor driven pump 142 to a line 143 leading to a direction control valve 119. The switch 117 also completes a circuit for energizing the solenoid 118 of this valve thus admitting pressure fluid to the head end of the cylinder 13 while connecting the rod end thereof to a drain line 144 through a then open valve 122. Rapid downward advance of the head 10 is thus initiated. As the teeth 28 approach the hole 25 to be bored as shown in phantom in FIG. 9, the cam 146 on the head 10 closes the switch LSa1 thus energizing the solenoid 121 of the valve 122 to interposing a restriction 123 in the path of fluid flow out of the rod end of the cylinder 13. The head advance then continues at a slower rate during feeding of the teeth 28 through the work to semifinish bore the hole 25.

After the teeth 28 pass the lower end of the work hole as shown in dotted outline in FIG. 9, the cam 146 closes a limit switch LSf to energize the solenoid 124 so as to reverse the valve 119 and direct high pressure fluid to the rod end of the cylinder 13 and release fluid from the head end through the restriction 123. Upward retraction of the head is thus initiated at a slow rate for finishing boring by the tooth 41. At the same time and, before the finishing tooth 41 reaches the lower end of the semifinished bore, closure of LSf by the cam 146 completes a circuit for energizing a solenoid 126 which shifts a valve 127 to direct high pressure fluid to the head end of the cylinder 81 and advance the piston 79 and the push rod 77 until the abutment 92 comes against the stop 93. In such advance, the wedge 50 cams the cantilever 45 and the tooth 41 outwardly to a position determined by the prevailing position of the stop 93. The tip 42 of the tooth is then for enlarging the hole to the diameter $d'$ which occurs as the retraction of the head 10 and spindle continue at the feed rate established by the restriction 123.

When the tooth 41 passes out of the upper end of the work bore and reaches the position shown in phantom in FIG. 9, a switch LSa2 is closed by the cam 146, thus energizing a solenoid 128 to open the valve 122 and permit the flow of high pressure fluid to the rod end of the cylinder 13 to continue at an increased rate for returning the head 10 rapidly to the starting position. On reaching the position shown in FIGS. 1 and 9, the cam 146 on the head closes a switch LSr1 energizing a solenoid 147 by which the valve 141 is shifted back to the stop position shown in FIG. 9.

Closure of LSa2 during the rapid return of the head also completes a circuit for energizing a solenoid 129 for reversing the valve 127 to direct high pressure to the rod end of the cylinder 81 and thus retract the push rod and the wedge 50 allow the tooth 41 to be retracted inwardly to the inactive position (FIG. 1) determined by the stop 56. Retraction of the push rod also separates its abutment 92 from the stop 93 so that the latter is free for readjustment by the step motor 108 if such readjustment is needed to compensate for wear at the tooth tip 42.

As an incident to such retraction, a cam 130 (FIGS. 2, 8 and 9) on the push rod portion 86 closes a limit switch 131 coacting with the then closed limit switch LSr to condition a circuit 132 to energize a relay 133 if the switch 116 is then closed. Energization of this relay closes a sealing switch 134 so that the relay remains energized long enough for the associated switches of the logic circuitry to initiate a pulsing cycle of the stepping motor 108. Thus if, at the time the head 10 and the push rod 77 are retracted, the switch 116 is closed as evidence of the need for outward adjustment of the tooth 41, the step motor 108 will be energized and its rotor turned through the predetermined angle thus turning the nut 104 and lowering the stop 93 correspondingly. In this new position, the stop will, in the next boring cycle as above described and during the advance of the push rod after semifinishing of the bore by the teeth 28, cause the wedge to set the tooth 41 outwardly an additional increment, for example 0.0001 of an inch. If such a single step of adjustment is insufficient to correct for the undersize of the holes being bored, the switch 116 is actuated again and used in one or more ensuing boring cycles to further adjust the stop 93 and cause the tooth 41 to be set out in similar increments at the ends of the head advance in each of such cycles.

By virtue of its reversible character, the same electric step motor 108 may, though the medium of the selector switch 114, be used in combination with a switch 137 to run the step motor under manual control in either direction thus facilitating the initial adjustment of the stop 93 or resetting of the same after replacement of a worn tooth 41 on the spindle. This may be accomplished by first setting the knob 136 according to the desired direction of the stepping and the closing the switch 137 until the stop has reached the desired position.

During normal cycling of the machine for boring successive workpieces, the switch 114b will be left closed so that the step motor will be conditioned for lowering the stop 93 each time it is energized by closure of the switch 137. When it becomes desirable to replace the cutter head 35 having new cutting teeth thereon, the stop 93 will be reset to a higher position. This is accomplished by turning the knob 136 to close the switch 114a so that, upon closure of the switch 137, the motor 108 will run in a direction to raise the stop. Such reverse operation of the step motor may be effected whenever the stop is lowered in the course of successive boring cycles, far enough to result in the finishing of the bore to a diameter larger than that desired.

MODIFIED CANTILEVER TOOTH MOUNTING

To adopt the adjustable tooth mounting for use in boring holes of diameters smaller than that of the spindle and cutter body 35, the free end portion of the cantilever is modified as shown in FIGS. 10 to 12 and extended beyond the end of the body and inwardly so that the tip 42 of the the tooth 41 may be disposed at a desired short radius. The parts common to the structure first described bear the same reference numerals.

For such modification, the cantilever 45 preferably takes the form of a fork of right angular U-shape having parallel legs 151 and 152 straddling the free end of the cutter head 35 and a projection 153 right with and extending outwardly from the center of the crosspiece 154 of the fork and along the rotational axis of the spindle. The tooth 41 for effecting the finish boring is secured to the projection in the manner above described and its radial position according to the size of the hole to be bored, is determined by the diameter of the projection. To cover the end of the cutter body and exclude foreign matter from the wedge and bearing, the crosspiece preferably comprises a cup telescoped loosely over the free end of the body 35.

The leg 151 of the fork is constructed, mounted and actuated the same as the straight bar cantilever above described. At its inner end, it is anchored to the cutter body 35 by screws 48 and threaded to receive the screw 73 bearing against the follower bar 68. In a similar way, screws 161 anchor the inner end of the other fork leg 152 to the body 35 on the side thereof opposite the leg 151. Thus, both legs 151, 152 bend back and forth laterally and in unison with changes in the axial position of the wedge 50, the radial position of the tooth tip 42 being changed correspondingly substantially the same as in the structure first described. Preferably, the projection 153 is a separately formed bar smaller in diameter than the holes to be bored by the tooth 41 and having at the inner end a flange 155 clamped by screws 156 to the crosspiece 154 and held centered relative to the spindle axis by a close telescoping of a pilot 157 thereon fitting into a correspondingly shaped recess 158 in the outer face of the crosspiece.

In spite of the elongation of the cantilever in order to dispose the tooth tip 42 at a short radius for boring small holes, provision is made for adjustment of the tip substantially in a true radial direction. To accomplish this, the legs 151 and 152 are constructed to induce bending thereof along parallel lines extending transversely of the legs close to the points of anchorage defined by the screws 48 and 161. In a similar way, the legs are weakened and bending thereof is facilitated along transversely extending lines spaced outwardly a short distance beyond the follower screw 73.

The above described weakening of the cantilever legs is achieved by forming relatively shallow and rounded bottom grooves 162, 163 across the inner sides of the legs along the lines above described. With the legs constructed and mounted as above described, the parts thereof between the grooves 161 and 162 constitute in effect opposite sides of a parallelogram whose outer end formed by the crosspiece 154 is rigid with and supports the cutter tooth 41 for movement substantially in the radial plane. The tooth tip 42 is thus maintained in essentially the same relation to the spindle axis in all of the positions of radial adjustments.

WEDGE MODIFICATION FOR MULTIPLE TOOTH CUTTERS

The cantilever tooth mounting and wedge adjusting action above described may be employed in boring cutters where it is desirable to employ a plurality of the finishing teeth 41 and thus reduce the loading on the individual teeth or increase the production capacity of the boring machine. Modification of the structure above described for achieving this objective is illustrated in FIGS. 13 to 16 in which three finishing blades 41, 41a, '41b are equidistantly spaced around the cutter body, mounted and supported on the free ends of straight bar cantilevers 45a, 45b and 45c of the construction first described and set out simultaneously and in equal increments in the advance of the push rod 53 in the boring cycles executed in the manner above described.

The cantilevers disposed in grooves equally spaced around the body are similarly anchored at their inner ends and connected near the free ends by screws 73a, 73b and 73c to follower bars 68a, 68b and 68c. The latter are mounted in grooves in the cutter body for bodily radial movement and, along their inner edges, bear against rows of needle bearings 65a, 65b and 65c, held in suitable retainers and bearing on their inner sides against surfaces 52a, 52b and 52c of a wedge 50 advanced axially and retracted in the same manner described above. As before, the wedge surfaces are inclined at the same small angle relative to the spindle axis and are spaced equidistantly around the wedge.

Along the side of the wedge opposite each of the inclined surfaces is a flat surface 51a, 51b and 51c paralleling the axis of the spindle and contacting a row of needle bearings 60a, 60b and 60c which are backed by bars 63a, 63b and 63c mounted on the inner wall of the cutter body, the same as in the single tooth finishing tool first described. Thus, the wedge is of hexagonal cross section with the inclined surfaces 52 spaced equidistantly around the wedge and alternating with the surfaces 51 backed by the bars 63a, 63b and 63c similarly spaced around the interior of the cutter body 35.

With the arrangement above described, it will be apparent that the wedge 50 is utilized to control accurately the radial positioning of the tips 42 of a plurality of angularly spaced teeth carried by a single cutter body. The loading on each tooth may thus be decreased correspondingly in the removal of metal to enlarge a work bore to a desired diameter.

We claim:

1. The combination of, a tool head, a rotary tubular spindle journaled in said head and projecting cantilever fashion therefrom, an elongated and resilient cantilever extending along the end portion of said spindle and anchored to the spindle at a point spaced from the free end thereof whereby to provide for outward and inward radial bending of the free end portion of the lever, a cutting tooth fixed to the free end of said cantilever so as to be adjustable outwardly to an active cutting position by outward bending of said cantilever, a wedge of small included angle disposed within and movable axially back and forth along said spindle and said cantilever, a backing surface rigid with said spindle on the side thereof opposite said cantilever, first and second rows of antifriction bearing elements disposed along opposite sides of said wedge and between such sides and said cantilever and said backing surface respectively, a rigid follower extending along and disposed within said spindle between said cantilever and the first row of said elements, means on the spindle holding said follower against movement axially of the spindle while supporting the follower for radial movement in response to axial movements of said wedge in opposite directions, and means providing between the free end portion of said cantilever and said follower a rigid connection for transmitting the radial movements of the follower to said cantilever to effect positive outward bending thereof and corresponding outward adjustment of said tooth in response to axial movement of said wedge in one direction while permitting reverse bending and inward retraction of the tooth with opposite axial movement of the wedge.

2. The combination defined in claim 1 in which the opposed surfaces engaged by said bearing elements are flat and each row of said elements comprises a plurality of parallel rollers spaced along said spindle.

3. The combination defined in claim 2 including retainers holding the rollers of each of said rows in spaced parallel relation.

4. The combination defined in claim 1 in which said follower is a rigid bar mounted for bodily radial floating relative to the spindle.

5. The combination defined in claim 1 in which the opposite sides of said wedge that engage said bearing elements converge toward each other and toward the spindle end whereby the cantilever is bent outwardly in response to endwise pushing of the wedge relative to the spindle.

6. The combination defined in claim 1 in which said cantilever and follower are rigid and said last mentioned means is a radially extending member secured at one end in one of the bars and, at its other end, abutting the other bar.

7. The combination defined in claim 1 in which said rigid connecting means extends radially between a point intermediate the ends of said follower and a point spaced along the cantilever away from the anchored end thereof.

8. The combination of, a tool head, a rotary tubular spindle journaled in said head and projecting cantilever fashion therefrom, an elongated and resilient cantilever extending along the end portion of said spindle and anchored to the spindle at a point spaced from the free end thereof whereby to provide for outward and inward radial bending of the free end portion of the lever, a cutting tooth fixed to the free end of said cantilever so as to be adjustable outwardly to an active cutting position by outward bending of said cantilever, an elongated wedge of small included angle and having opposite flat side surfaces disposed within and movable axially back and forth along said spindle and said cantilever, an elongated backing surface on said spindle corresponding in length to the wedge and rigidly backing the same on the side thereof opposite said cantilever, an elongated and rigid follower bar extending along and disposed within said spindle between said cantilever and the opposite side of said wedge, means on the spindle holding said bar against movement axially of the spindle while supporting the bar for radial movement in response to axial movements of said wedge in opposite directions, and a member providing a rigid connection between said cantilever and the intermediate portion of said bar whereby to effect positive outward bending of the cantilever in response to axial movement of said wedge in one direction while permitting reverse bending with opposite axial movement of the wedge.

9. The combination defined in claim 8 including parallel roller bearings spaced apart along said wedge and arranged in rows substantially as long as said follower bar, one row being disposed between and bearing against said backing surface and the opposed surface of the wedge and the other row being disposed between the other wedge surface and said follower bar.

10. The combination defined in claim 8 in which said cantilever is an elongated bar and the member is a screw threaded at one end into one of said bars transversely thereof.

11. The combination defined in claim 10 in which the outer end of said screw is exposed and adapted for engagement with a tool for turning the screw to vary the spacing of the cantilever from said follower bar.

12. The combination defined in claim 8 in which said cantilever is disposed in a radially opening slot in said spindle having parallel side walls engaging opposite longitudinal sides of the cantilever to accurately guide the radial bending thereof and hold the cantilever against vibration during cutting engagement of said tooth with a workpiece in all of the adjusted positions of said tooth.

13. The combination as defined in claim 8 in which said member extends radially through a hole in said spindle including means providing a fluid tight seal between the member and spindle so as to prevent the entry of foreign matter to said follower bar and wedge surfaces while permitting free radial movement of the member.

14. The combination defined in claim 1 in which said cantilever comprises a fork of generally U-shape having laterally spaced legs straddling the free end of said spindle and anchored at their ends to opposite sides of said spindle, a crosspiece disposed beyond and extending across said spindle end, and a member rigid with and projecting from the center of said crosspiece and supporting said cutting tooth in boring position at a point spaced from the spindle end, said connecting means joining one of said legs with said follower.

15. The combination defined in claim 14 in which the leg of the U on the side of said spindle opposite said follower is disconnected from the follower and free to swing laterally back and forth with the first leg.

16. The combination defined in claim 15 in which said crosspiece of said cantilever comprises a disk disposed adjacent and covering the free end of said spindle.

17. The combination defined in claim 1 in which said cantilever includes a rigid extension projecting along said spindle beyond the end thereof and then inwardly toward the spindle axis, and means on the free end of the cantilever beyond the spindle end supporting said tooth with the tip thereof disposed at a radius shorter than the radius of the spindle.

18. The combination defined by claim 17 in which the free end portion of said cantilever is a bar projecting along the axis of the spindle beyond the free end of the latter.

19. The combination defined in claim 8 in which the assembly comprising said cantilever, said wedge and backing surfaces, said follower and said tooth are disposed in a common transaxial plane, and including one or more similarly constructed assemblies of a cantilever, cutting tooth, wedge and backing surfaces and follower similarly mounted in a common transaxial plane, said assembly planes being equidistantly spaced around said spindle axis whereby to balance the laterally directed forces holding the several cutting teeth during the boring of a work hole.

20. The combination of, a tool head, a tubular spindle journaled by said head and projecting therefrom, a cutter tooth mounted on the free end portion of said spindle for adjustment radially of the spindle between an inner inactive position and an outer cutting position, an operating rod disposed within said spindle and movable along the axis thereof, a reversible power actuator mounted on said head and operable to move said rod in first and second directions axially of the spindle, means within said spindle coupling said rod to said tooth and operable to set the tooth outwardly during movement of the rod in said first direction and to cause retraction of the tooth inwardly as the rod is moved in said second direction, a tubular screw element surrounding said rod, a nut element threaded onto the screw element, means on said head supporting one of said elements in an axially fixed position and for rotation about the spindle axis, means on said head supporting the other of said elements for movement along said axis while holding such element against turning, a stop movable with said other element in response to turning of the rotatable element, an abutment movable with said rod and engageable with said stop to limit the advance of the rod in said first direction by said power actuator, and means on said head for turning said rotatable element selectively to thereby adjust the position of said stop.

21. The combination defined in claim 20 in which said stop is fixed to one end of one of said elements and said abutment is fixed to said rod.

22. The combination defined in claim 21 in which said other element is the screw and the rotatable element is a nut threaded onto such screw.

23. The combination defined in claim 20 in which said turning means comprises an electric motor of the stepping type having a rotor turned angularly through a predetermined angle each time the motor is energized.

24. The combination defined in claim 23 including means coupling said stepping motor to said rotatable element and selectively operable means for pulsing said motor to turn such element in steps of predetermined arcuate length and thereby determine the increments of advance of said stop and therefore of set-out of said cutting tooth.

25. The combination as defined in claim 23 in which said stepping motor includes windings selectively energizable to cause rotation in opposite directions and adjustment of said stop in a direction corresponding to the selected direction of rotation.

26. The combination as defined in claim 20 for enlarging a hole in a workpiece including means operating in a continuous cycle to advance and retract said head toward and away from a workpiece to advance and retract said spindle and cutting tooth into and through said work hole, and means operating in response to movement of said head to maintain said actuator inactive and said tooth retracted inwardly during the advance of the head and movement of the tooth through and beyond the work hole, to activate the actuator before the tooth reaches said hole during retraction of the head and, during such retraction of said spindle and tooth through said hole, to maintain the actuator active and the tooth in said active position.

27. The combination as defined in claim 26 including power actuated means adapted when activated to adjust said stop relative to said head for setting said tooth outwardly a predetermined increment when said actuator is again activated, a member movable to a set position indicating the need for outward adjustment of said tooth, and means responsive to the location of said member in said set position to activate said power actuated means while said abutment is out of engagement with said stop.

* * * * *